(12) United States Patent
Melcer et al.

(10) Patent No.: US 7,437,944 B2
(45) Date of Patent: Oct. 21, 2008

(54) METHOD AND APPARATUS FOR PRESSURE AND MIX RATIO CONTROL

(75) Inventors: Chris Melcer, Sunnyvale, CA (US); John Lane, San Jose, CA (US)

(73) Assignee: Applied Materials, Inc., Santa Clara, CA (US)

( * ) Notice: Subject to any disclaimer, the term of this patent is extended or adjusted under 35 U.S.C. 154(b) by 0 days.

(21) Appl. No.: 11/684,888

(22) Filed: Mar. 12, 2007

(65) Prior Publication Data

US 2007/0204702 A1 Sep. 6, 2007

Related U.S. Application Data

(63) Continuation-in-part of application No. 11/475,805, filed on Jun. 27, 2006, now Pat. No. 7,204,155, which is a continuation of application No. 10/838,175, filed on May 3, 2004, now abandoned.

(60) Provisional application No. 60/527,428, filed on Dec. 4, 2003.

(51) Int. Cl.
*G01F 1/00* (2006.01)

(52) U.S. Cl. ...................................................... 73/861

(58) Field of Classification Search ................ 73/861
See application file for complete search history.

(56) References Cited

U.S. PATENT DOCUMENTS

| | | | |
|---|---|---|---|
| 3,750,472 A | * | 8/1973 | Ducousset ............... 73/861.02 |
| 3,762,428 A | | 10/1973 | Beck et al. |
| 4,687,020 A | | 8/1987 | Doyle |
| 5,062,446 A | | 11/1991 | Anderson |
| 5,129,418 A | | 7/1992 | Shimomura et al. |
| 5,141,021 A | | 8/1992 | Shimomura et al. |
| 5,190,068 A | | 3/1993 | Philbin |
| 5,293,778 A | | 3/1994 | Schneiter |
| 5,303,731 A | | 4/1994 | Vavra et al. |
| 5,524,084 A | | 6/1996 | Wang et al. |
| 5,575,853 A | * | 11/1996 | Arami et al. ................ 118/708 |
| 5,780,729 A | * | 7/1998 | Escobar ................... 73/118.01 |
| 5,785,033 A | * | 7/1998 | Kawamoto et al. ........... 123/520 |
| 5,853,485 A | * | 12/1998 | Rudolph et al. ............. 118/715 |
| 5,900,297 A | * | 5/1999 | Rudolph et al. ............ 428/66.2 |
| 5,911,238 A | | 6/1999 | Bump et al. |
| 5,925,829 A | | 7/1999 | Laragione et al. |
| 5,944,048 A | | 8/1999 | Bump et al. |
| 5,966,499 A | | 10/1999 | Hinkle et al. |

(Continued)

OTHER PUBLICATIONS

PCT International Search Report amd Written Opinion dated Jul. 14, 2008 for International Application No. PCT/US2008/055015. (APPM/008848-PCT).

*Primary Examiner*—Harshad Patel
(74) *Attorney, Agent, or Firm*—Patterson & Sheridan

(57) ABSTRACT

The present invention provides apparatus and method for controlling mix ratio of gas supplied to a processing chamber integrated with chamber pressure. In one embodiment, an integrated controller is used to adjust mix ratio and chamber pressure. In one embodiment, the mix ratio and chamber pressure may be adjusted using a flow sensor and a control valve disposed in each gas supply line. In one embodiment, the flow sensor used in each gas supply line is insensitive to upstream pressure perturbations.

20 Claims, 4 Drawing Sheets

U.S. PATENT DOCUMENTS

| | | | |
|---|---|---|---|
| 6,057,022 A * | 5/2000 | Purdy et al. | 428/66.2 |
| 6,119,710 A | 9/2000 | Brown | |
| 6,138,708 A | 10/2000 | Waldbusser | |
| 6,152,162 A * | 11/2000 | Balazy et al. | 137/110 |
| 6,216,726 B1 | 4/2001 | Brown et al. | |
| 6,269,692 B1 | 8/2001 | Drexel et al. | |
| 6,343,617 B1 | 2/2002 | Tinsley et al. | |
| 6,532,796 B1 | 3/2003 | Ikeda | |
| 6,640,822 B2 | 11/2003 | Tinsley et al. | |
| 6,681,787 B2 | 1/2004 | Tinsley et al. | |
| 6,712,084 B2 | 3/2004 | Shajii et al. | |
| 6,780,462 B2 * | 8/2004 | Purdy et al. | 427/248.1 |
| 6,868,862 B2 * | 3/2005 | Shajii et al. | 137/487.5 |
| 6,945,123 B1 | 9/2005 | Kuehl et al. | |
| 7,195,026 B2 * | 3/2007 | Znamensky et al. | 137/15.04 |
| 2002/0466122 | 4/2002 | Mudd | |
| 2002/0114732 A1 | 8/2002 | Vyers | |
| 2002/0117202 A1 | 8/2002 | Tinsley et al. | |
| 2002/0117212 A1 | 8/2002 | Vyers et al. | |
| 2002/0139418 A1 | 10/2002 | Tinsley et al. | |
| 2002/0179149 A1 | 12/2002 | Ohmi et al. | |
| 2002/0198668 A1 | 12/2002 | Lull et al. | |
| 2003/0234039 A1 | 12/2003 | Shajii et al. | |
| 2003/0234048 A1 | 12/2003 | Shajii et al. | |
| 2003/0236592 A1 | 12/2003 | Shajii et al. | |
| 2003/0236638 A1 | 12/2003 | Shajii et al. | |
| 2003/0236643 A1 | 12/2003 | Shaijii et al. | |
| 2004/0074311 A1 | 4/2004 | Lull et al. | |
| 2004/0083807 A1 | 5/2004 | Mudd et al. | |
| 2004/0128021 A1 | 7/2004 | Klekotka | |
| 2005/0120805 A1 | 6/2005 | Lane et al. | |
| 2005/0189074 A1 | 9/2005 | Kasai et al. | |
| 2006/0037644 A1 | 2/2006 | Nishikawa et al. | |
| 2006/0243060 A1 | 11/2006 | Lane et al. | |

* cited by examiner

US 7,437,944 B2

METHOD AND APPARATUS FOR PRESSURE AND MIX RATIO CONTROL

CROSS-REFERENCE TO RELATED APPLICATIONS

This application is a continuation-in-part of U.S. patent application Ser. No. 11/475,805 (APPM/008848.C1), filed Jun. 27, 2006, now U.S Pat. No. 7,204,155, which is a continuation of U.S. patent application Ser. No. 10/838,175 (APPM/008848), filed May 3, 2004, now abandoned, which claims benefit of U.S. Provisional Patent Application Ser. No. 60/527,428 (APPM/008848L), filed Dec. 4, 2003. Each of the aforementioned related patent applications is herein incorporated by reference.

BACKGROUND OF THE INVENTION

1. Field of the Invention

Embodiments of the present invention generally relate to a method and apparatus for controlling pressure and mix ratio in gas delivery. More specifically, embodiments of the invention generally relate to a method and apparatus for controlling pressure and mix ratio of gas provided to a semiconductor processing chamber.

2. Description of the Related Art

Processing gases are widely used in semiconductor processing. Processing gases may be provided as reactant gas, carrier gas or purge gas to process a front side of a substrate. Gases may also be provided between a substrate and a substrate support in a semiconductor processing chamber to maintain a precise and uniform of substrate temperature.

Pressure and mix ratio of the processing gas are important process control attributes to many semiconductor processes. Pressure and mix ratio are conventionally controlled separately.

FIG. 1 depicts a simplified schematic of a conventional semiconductor processing chamber 100 having a gas delivery system 120 shown providing processing gas to a processing volume 103 in the processing chamber 100. The processing volume 103 defined by a chamber body 101 is configured to process a substrate 104 therein. The processing volume 103 is in selective fluid communication with a vacuum pump 105 via a throttle valve 107. The vacuum pump 105 maybe connected to a rough pump 106. The processing chamber 100 may be configured to perform chemical vapor deposition (CVD), physical vapor deposition (PVD), atomic layer deposition (ALD), etching or other processing technique. Process gas delivery systems, pumping systems and the like for controlling processes performed within the processing chamber are well-known and have been omitted for the sake of brevity.

The gas delivery system 120 is configured to mix and deliver two or more gases to the processing chamber 100 via a gas line 131. A shut off valve 129 is positioned on the gas line 131. As shown in FIG. 1, the gas delivery system 120 includes a first gas supply and a second gas supply line parallel to one another. The first gas supply line include a gas source 121 connected to the gas line 131 via a shut off valve 123 and a control valve 127. The second gas supply line includes a gas source 122 connected to the gas line 131 via a shut off valve 124 and a control valve 127.

During process, gases from the gas sources 121, 122 come through control valves 127, 128 respectively, are mixed together in the gas line 131 and are delivered to the processing volume 103. The ratio of each gas in the gas mixture is controlled by a ratio controller 130. The ratio controller 130 adjusts the control valves 127, 128 to obtain desired mix ratio in the gas delivered to the processing chamber 100.

Chamber pressure is controlled separately from the mix ratio. A pressure control unit 110 may be used to obtain a desired pressure the chamber. The pressure control unit 110 may adjust the chamber pressure by adjusting the throttle valve 107 according to feedback from a chamber pressure gauge 109. Chamber pressure is a result of flow rate from the gas line 131 and the status of the throttle valve 107.

The conventional chamber pressure and mix ratio control described above has a relatively slow responding time to achieve a target chamber pressure and/or a target mix ratio. For example, when adjusting chamber pressure from a lower pressure to a higher pressure, the pressure control unit 108 decreases opening of the throttle valve 107 and wait for more gas flowing in from the gas line 131 to increases the chamber pressure. On the one hand, it may take a few seconds before the chamber pressure reaches the desired value, which is long relative to a typical semiconductor processing step. On the other hand, it takes relatively long time to adjust a mix ratio in the process volume 103 too. For example, when adjusting a mix ratio from 50% gas A-50% gas B to 70% gas A-30% gas B, the mix ratio controller 130 can adjust the control valves 125, 126 to change the flow rates supplied to the gas line 131. However, existing gas in the processing volume 103 will have to be pumped out before mix ratio reaches desired valve in the processing volume 103.

Additionally, the above described chamber pressure and mix ratio control requires two sets of controllers which increase total cost.

Therefore, there is a need for an improved method and apparatus for controlling chamber pressure and gas mix ratio in a semiconductor processing system.

SUMMARY OF THE INVENTION

A method and apparatus for gas control is provided for rapid adjustment of mix ratio supplied to a processing chamber and for adjustment of chamber pressure.

One embodiment provides an apparatus for gas control comprising a first flow sensor having an inlet connected to a first gas line adapted for coupling a gas supply, a first control valve coupled to an outlet of the first flow sensor, a second flow sensor having an inlet connected to a second gas line adapted for coupling a gas supply, a second control valve coupled to an outlet of the second flow sensor, and a third gas line having an inlet coupled to outlets of both the first control valve and the second control valve.

Another embodiment provides an apparatus for gas control comprising a first gas supply line that comprises a first flow sensor, a first control valve, a first gas line coupled to an inlet of the first flow sensor, and a second gas line coupled to an outlet of the first flow sensor and an inlet of the first control valve, a second gas supply line that comprises a second flow sensor, a second control valve, a third gas line coupled to an inlet of the second flow sensor, and a fourth gas line coupled to an outlet of the second flow sensor and an inlet of the second control valve, and an output line coupled to an outlet of the first control valve and an outlet of the second control valve.

Yet another embodiment provides a gas delivery system comprising a first gas line configured for coupling to a first gas supply, a first flow sensor having an inlet connected to the first gas line, a first control valve coupled to the first flow sensor, a second gas line configured for coupling to a second gas supply, a second flow sensor having an inlet connected to the second gas line, a second control valve coupled to the second flow sensor, a third gas line having an upstream end connected to outlets of the first and second control valves and a downstream end configured for coupling to a processing chamber, and a controller configured to control a ratio of a gas flow in the first gas line and a gas flow in the second gas line, wherein the controller receives measurement form the first and second flow sensors and sends control signals to the first and second control valves.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, wherever possible, to designate identical elements that are common to the figures.

DETAILED DESCRIPTION

The present invention provides apparatus and method for controlling mix ratio of gas supplied to a processing chamber integrated with chamber pressure. In one embodiment, an integrated controller is used to adjust mix ratio and chamber pressure simultaneously. One embodiment provides a flow device for controlling a chamber pressure while simultaneously controlling mix ratio of gases. In one embodiment, the mix ratio and chamber pressure may be adjusted using a flow sensor and a control valve disposed in each gas supply line. In one embodiment, the flow sensor used in each gas supply line is insensitive to upstream pressure perturbations.

Figure 1:
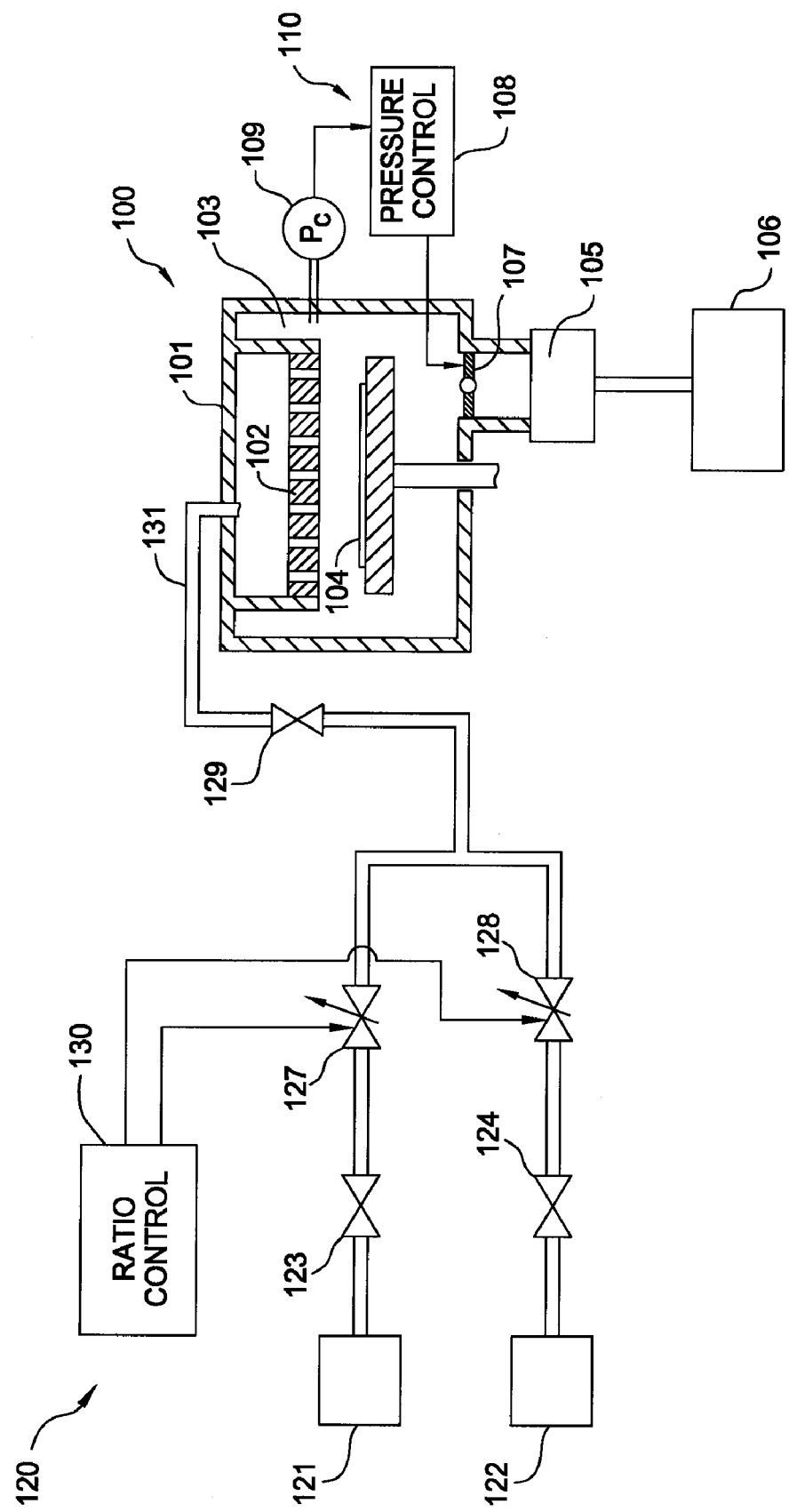
FIG. 1 is a simplified schematic of a conventional semiconductor processing chamber and gas delivery system.
Figure 2:
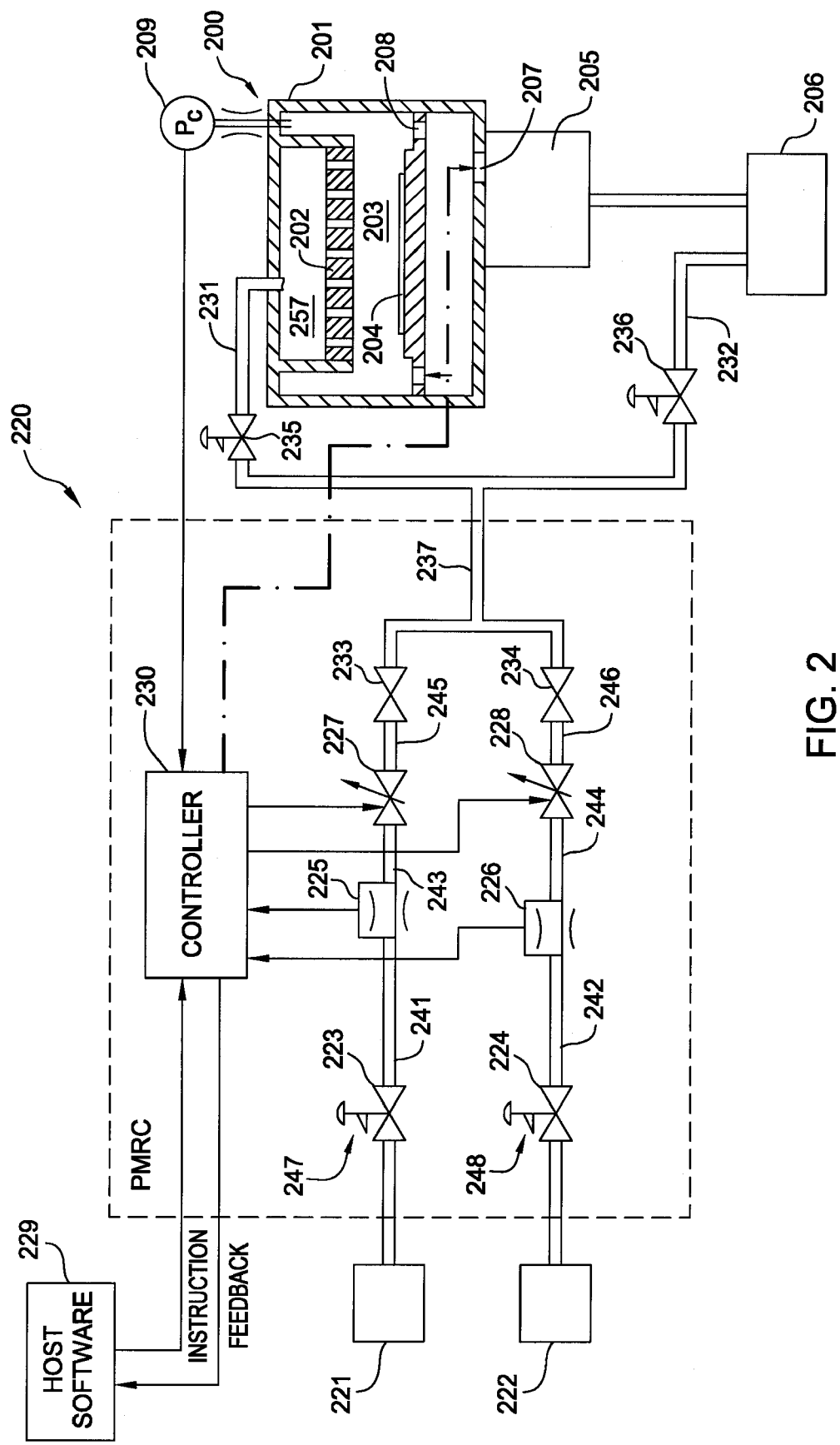
FIG. 2 schematically illustrates a gas delivery system in accordance with one embodiment of the present invention coupled to an exemplary semiconductor processing chamber.

FIG. 2 schematically illustrates a gas delivery system 220 in accordance with one embodiment of the present invention coupled to an exemplary semiconductor processing chamber 200.

The gas delivery system 220 is configured to provide processing gas to a processing volume 203 in the processing chamber 200 with desired mix ratio and chamber pressure. The processing volume 203 is defined by a chamber body 201 and is configured to process one or more substrate 204 therein. The processing volume 203 is in selective fluid communication with a vacuum pump 205 via a restriction 208 and/or a restriction 207. The restrictions 207, 208 may be throttle valves or dump valves configured to quickly decrease or increase conductance between the processing volume 203 and the vacuum pump 205. The vacuum pump 205 may be connected to a rough pump 206. The processing chamber 200 may be configured to perform chemical vapor deposition (CVD), physical vapor deposition (PVD), atomic layer deposition (ALD), etching or other processing technique. Process gas delivery systems, pumping systems and the like for controlling processes performed within the processing chamber are well-known and have been omitted for the sake of brevity.

The gas delivery system 220 is configured to mix and deliver two or more gases to the processing chamber 200. As shown in FIG. 2, a host software 229 is connected the gas delivery system 220 to provide mix ratio and chamber pressure instructions. In one embodiment, the host software 229 may receive one or more feedback signals from the gas delivery system 220 for monitoring system performance or for a closed loop control. The host software 229 may additionally control processes performed in the processing chamber 200.

The gas delivery system 220 comprises a first gas supply line 247 and a second gas supply line 248. The first gas supply line 247 and the second gas supply line 248 are in parallel connection. The first gas supply line 247 is connected to a gas source 221 and second gas supply line 248 is connected to a second gas source 222. The gas delivery system 220 comprises an output gas line 237 configured to output a mixture of gases comprising gases from the first and second gas sources 221, 222. The output gas line 237 may be connected to an inlet line 231 of the process chamber 200 through a shut off valve 235. The output gas line 237 may connect to a bypass line 232 via a shut off valve 236. The bypass line 232 may be connected directly to the rough pump 206 or the chamber body 201 then to the vacuum pump 205. The shut off valves 235, 236 determine whether the gas mixture from the gas delivery system 220 goes to the processing chamber 200 or to be bypassed. In one embodiment, the shut off valves 235, 236 are interlocked. In one embodiment, the shutoff valves 235, 236 may be hybrid valves with pneumatic and manual actuators.

The gas delivery system 220 comprises a controller 230, and two or more gas parallel gas supply lines connected together at down stream end. As shown in FIG. 2, the gas supply line 247 and the gas supply line 248 are parallel to another, each configured to carry a gas from a gas source connected upstream. The gas supply line 247 and the gas supply line 248 joint together with the output 237.

The gas supply line 247 comprises a flow sensor 225 and a control valve 227. An inlet of the flow sensor 225 is coupled to a first intermediate line 241, which may be connected to the gas source 221 via shut off valve 223. A second intermediate line 243 is coupled to an outlet of the flow sensor 225 and an inlet of the control valve 227. An outlet of the control valve 227 is coupled to a third intermediate line 245, which is connected to the output gas line 237. The flow sensor 225 provides a metric indicative of flow passing into the gas delivery system 220 from the gas source 221. The control valve 227 modulates the flow rate passing into the gas delivery system 220 from the gas source 221. The gas supply line 247 may comprises a shutoff valve 233 in the third intermediate line 245.

Similarly, the gas supply line 248 comprises a flow sensor 226 and a control valve 228. An inlet of the flow sensor 226 is coupled to a first intermediate line 242, which may be connected to the gas source 222 via a shut off valve 224. A second intermediate line 244 is coupled to an outlet of the flow sensor 226 and an inlet of the control valve 228. An outlet of the control valve 228 is coupled to a third intermediate line 246, which joints the third intermediate line 245 of the gas supply line 247 and is coupled to the output gas line 237. The flow sensor 226 provides a metric indicative of flow passing into the gas delivery system 220 from the gas source 222. The control valve 228 modulates the flow rate passing into the gas delivery system 220 from the gas source 222. The gas supply line 248 may comprises a shutoff valve 234 in the third intermediate line 246.

The gas delivery system 220 comprises a controller 230. The controller 230 receives instructions from the host software 229, or from a system controller. The controller 230 receives measurement signals from the flow sensors 225, 226, and from a pressure sensor 209 configured to measure chamber pressure in the processing volume 203. The controller 230 provides control signals to the control valves 227, 228 according to instructions from the host software 229 and measurements from the sensors.

In one embodiment, the controller 230 may provide control signals to the restriction 207 and/or the restriction 208 to assist chamber pressure and/or mix ratio control. In another embodiment, the host software 229 may send control signals to the restriction 207 and/or the restriction 208 during process to assist chamber pressure and/or mix ratio control.

The pressure sensor 209 is configured to measure the actual chamber pressure in the processing volume 203. A cavity 257 in fluid communication with the inlet line 231 may be present between the processing volume 203 and the outline line 231. The actual chamber pressure is likely to be different from the pressure in the inlet line 231 because there usually exists a restriction, such as a shower head 202, between the processing volume 203 and the inlet line 231 or the cavity 257. The shutoff valves 235, 236 may be pneumatic valves necessary to allow quick dump of line pressure upstream of the chamber 200 when changing pressure set point or when changing mix ratio. The control valves 235,236 may be interlocked to prevent pumping chamber gas into the gas delivery system 220 and to prevent impacts to chamber pressure. The shutoff valves 223, 224 may be pneumatic valves necessary to isolate gases from different gas sources.

During process, gases from the gas sources 221, 222 come through the control valves 227, 228 respectively, are mixed together in the output gas line 237 and are delivered to the processing volume 203, or bypassed through the bypass line 232. The ratio of each gas in the gas mixture and the chamber pressure are controlled by the controller 230. In one embodiment, the controller 230 adjusts the control valves 227, 228 according to measurement from the flow sensors 225, 226 to obtain desired mix ratio in the gas delivered to the processing chamber 200 and desired chamber pressure. In another embodiment, the controller 230 adjusts the control valves 227, 228 and restrictions in the processing chamber 200, such as the restrictions 207, 208, according to measurement from the flow sensors 225, 226 to the processing chamber 200. The controller 230 may hasten the change in mix ratio and/or adjust the rate of turn over in the process chamber by adjusting the restrictions in the processing chamber 200, especially when additional parameters impact the process.

The gas delivery system 220 is configured to control mix ratio of gases chamber pressure, or actual flow into the chamber. Conventional control algorithms may be used to achieve control tasks.

In one embodiment, the gas delivery system 220 may be set to one or more transient states before settles in a steady state to obtain speedy adjustment to mix ratio and/or chamber pressure. For example, when adjusting the chamber pressure from a higher pressure to a lower pressure, the controller 230 may close both control valves 227, 228 in a transient state to allow the chamber pressure to drop. While the control valves 227, 228 are then set to positions that maintain the lower pressure in the processing volume 203.

Figure 3:
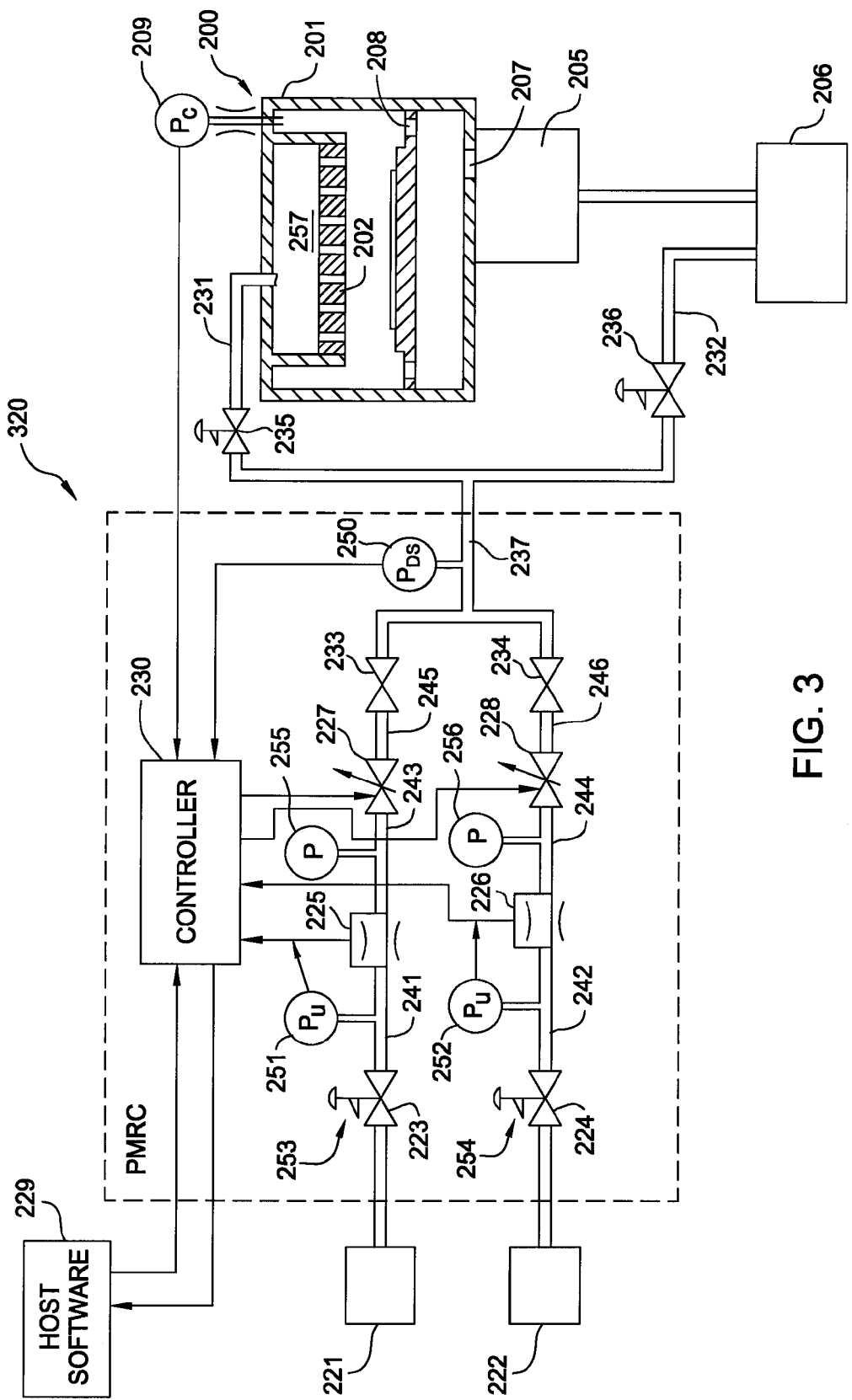
FIG. 3 schematically illustrates a gas delivery system in accordance with one embodiment of the present invention. The gas delivery system has a pressure insensitive flow sensing mechanism and is coupled to an exemplary semiconductor processing chamber.

FIG. 3 schematically illustrates a gas delivery system 320 in accordance with one embodiment of the present invention. The gas delivery system 320 has a pressure insensitive flow sensing mechanism and is coupled to an exemplary semiconductor processing chamber 200. Identical reference numerals have been used for similar elements in FIGS. 2 and 3 for simplicity.

The gas delivery system 320 comprises gas supply lines 253, 254. The gas supply lines 253, 254 are similar to the gas supply lines 247, 248 except that the gas supply lines 253, 254 comprise upstream pressure sensors 251, 252 coupled to the intermediate lines 241, 242. The pressure sensors 251, 252 are configured to sense a metric indicative of pressure within the intermediate lines 241, 242. In one embodiment, the pressure sensors 251, 252 are used to ensure that the flow sensors 225, 226 are insensitive to upstream pressure perturbations. In one embodiment, measurements from the flow sensors 225, 226 may be compensated by a function of $dP_U/dt$, wherein $P_U$ is a pressure measurement from the pressure sensors 251, 252. In one embodiment, the actual flow may be calculated using the following equation:

$$F_A = F_S - F_{66P}(dP_U/dt),$$

wherein $F_A$ is the actual flow in each gas supply line 253, 254, $F_S$ is the flow measured by the flow sensor 225, 226, and $F_{\Delta P}$ is flow compensation due to the pressure changes upstream to the flow sensor 225, 226.

In another embodiment, an intermediate pressure sensor 255, 256 may be used to measure metrics indicative of pressure in the second intermediate lines 243, 244, and the actual flow may be calculated using the following equation:

$$F_A = F_S + F_{\Delta Ps}\left(\frac{dP_S}{dt}, V_S\right) - F_{\Delta P}(dP_U/dt)$$

wherein $P_S$ is a pressure measurement from the pressure sensor coupled to the second intermediate line 243, 244, $V_S$ is the volume of the second intermediate line 243, 244 (or volume between the flow sensor 225, 226 and the control valve 227, 228).

A more detailed description of pressure insensitive flow rate measurement may be found in the U.S. patent application Ser. No. 10/838,175, filed May 3, 2004, which is incorporated herein by reference.

The gas delivery system 320 further comprises a downstream pressure sensor 250 coupled to the outlet line 237. The downstream pressure sensor 250 is configured to sense a metric indicative of pressure within downstream volume $V_{DS}$. In the embodiment of FIG. 3, $V_{DS}$ is the volume between the control valves 227, 228 and the shower head 202. In one embodiment, the downstream volume $V_{DS}$ comprises the volume of the outlet line 237, the inlet line 231, the cavity 257, and all the inner volumes of the valves. Measurement of the downstream sensor 250 may be used to calculate transient mix ratio of gases, the actual flow into the processing chamber, and the chamber pressure.

The actual flow into the processing chamber may be a summation of all measured or calculated flow in each gas supply line in the gas delivery system 320, and a transient flow caused by pressure perturbation within the downstream volume $V_{DS}$.

In one embodiment, the actual flow into the processing chamber 200 may be calculated from the following equation:

$$F_C = \sum F_A - TF_{DS}\left(\frac{dP_{DS}}{dt}, V_{DS}\right)$$

wherein $F_A$ is the actual flow in each gas supply line 253, 254, $F_C$ is the actual flow into the processing chamber, $P_{DS}$ is pressure sensor measurement of the downstream volume $V_{DS}$, and $TF_{DS}$ is transient flow into $V_{DS}$ associated with the changes of pressure in $V_{DS}$, flow compensation due to the pressure changes upstream to the flow sensor 225, 226.

When the downstream sensor 250 is not used, it is desirable to minimize the downstream volume $V_{DS}$ to reduce transient flow into $V_{DS}$ associated with pressure changes in $V_{DS}$.

In one embodiment, the gas delivery system 320 may be used to calculate the downstream volume. For example, the gas delivery system 320 may be used to isolate the downstream volume from a system volume (volume between shutoff valves 223, 224 and shutoff valves 233, 234) first, then pressurize the system volume and isolate the system volume from a pressure source, then join the system volume and the downstream volume. The downstream volume may be calculated from pressure measurements of the system volume before and after joining the downstream volume using the ideal gas law.

The controller 230 receives measured metrics from the pressure sensors 209, 251, 252, 250 and from the flow sensors 225, 226. In one embodiment, the controller 230, may be in conjunction with the host software 229, determines adjustment needs to be performed to the control valves 227, 228, and the shutoff valves 223, 224, 233, 234, 235, 236 to achieve target mix ratio and chamber pressure. In one embodiment, one or more transient states may be used prior to a steady state to achieve rapid mix ratio or chamber pressure change.

Figure 4:
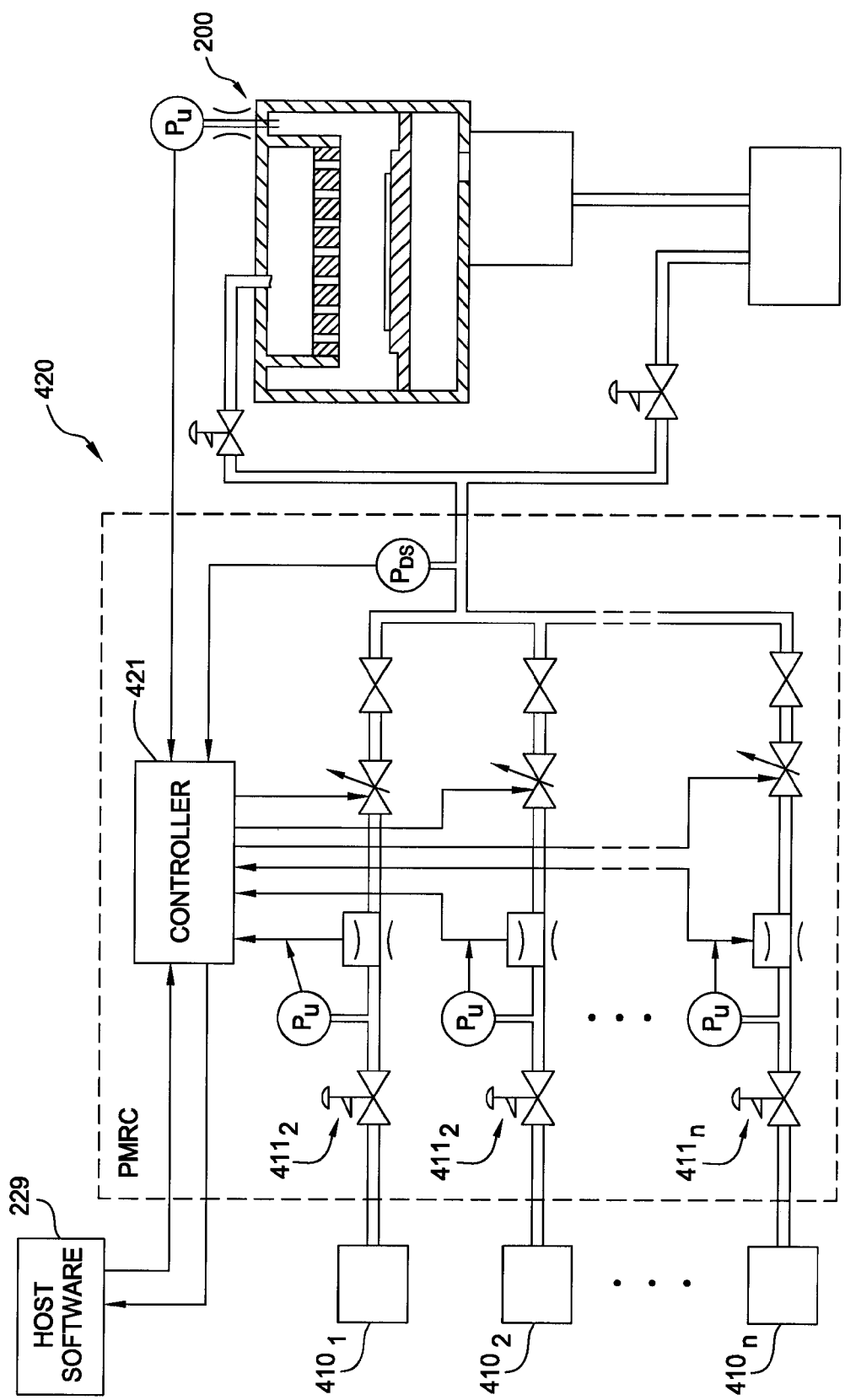
FIG. 4 schematically illustrates a gas delivery system in accordance with one embodiment of the present invention. The gas delivery system has a plurality of gas supply lines and is coupled to an exemplary semiconductor processing chamber.

FIG. 4 schematically illustrates a gas delivery system 420 in accordance with one embodiment of the present invention. The gas delivery system 420 has a plurality of gas supply lines $411_1$-$411_n$ and is coupled to an exemplary semiconductor processing chamber 200. Each of the plurality of gas supply lines $411_1$-$411_n$ is connected to a gas source $410_1$-$410_n$, and is configured to provide a gas from a corresponding gas source.

The gas delivery systems of the present invention provide enable rapid adjustment of chamber pressure and mix ratio for one or more process gases. The gas delivery systems allow flexible control of mix ratio and chamber pressure. Shutoff valves and control valves may be used in combination to achieve desired status. For example, to reduce chamber pressure, the shut off valves 233, 234 may be closed temporally to allow chamber pressure to drop and then reopen adjusted control valves 227, 228. In another case, to change mix ratio from 50%-50% to 70%-30%, a transient mix ratio, for example, 90%-10%, may be flown to the chamber to mix with existing gas in the chamber prior to settle in 70%-30%. It is contemplated that people skilled in the art may use gas delivery systems of the present invention to achieve different control tasks.

While the foregoing is directed to embodiments of the present invention, other and further embodiments of the invention may be devised without departing from the basic scope thereof, and the scope thereof is determined by the claims that follow.

The invention claimed is:

1. An apparatus for gas control, comprising:
    a first flow sensor having an inlet connected to a first gas line adapted for coupling a gas supply;
    a first control valve connected with an outlet of the first flow sensor;
    a first upstream pressure sensor connected to the first gas line;
    a second flow sensor having an inlet connected to a second gas line adapted for coupling a gas supply;
    a second control valve connected with an outlet of the second flow sensor;
    a second upstream pressure sensor connected to the second gas line;
    a controller configured to control the ratio of a gas flow from the first gas line and a gas flow from the second gas line, wherein the controller receives measurement signals from the first and second flow sensors and the first and second upstream pressure sensors, and sends control signals to the first and second control valves, and wherein measurements of the first flow sensor are compensated by measurements of the first upstream pressure sensor so that the measurements of the first flow sensor are pressure insensitive, and wherein measurements of the second flow sensor are compensated by measurements of the second upstream pressure sensor so that the measurements of the second flow sensor are pressure insensitive; and
    a third gas line having an inlet coupled to outlets of both the first control valve and the second control valve.

2. The apparatus of claim 1, wherein
    a flow of gas passing through the first gas line may be expressed as:

$$F_{A1}=F_{S1}-F_{\Delta P1}(dP_{U1}/dt),$$

wherein $F_{A1}$ is the flow of gas passing through the first gas line, $F_{S1}$ is the flow measured by the first flow sensor, $P_{U1}$ is the pressure measured by the first upstream pressure sensor, and $F_{\Delta P1}$ is flow compensation due to the pressure changes in the first gas line, and
    a flow of gas passing through the second gas line may be expressed as:

$$F_{A2}=F_{S2}-F_{\Delta P2}(dP_{U2}/dt),$$

wherein $F_{A2}$ is the flow of gas passing through the second gas line, $F_{S2}$ is the flow measured by the second flow sensor, $P_{U2}$ is the pressure measured by the second upstream pressure sensor, and $F_{\Delta P2}$ is flow compensation due to the pressure changes in the second gas line.

3. The apparatus of claim 1, further comprising a downstream pressure sensor coupled to the third gas line and adapted to sense a metric indicative of pressure of the third gas line.

4. The apparatus of claim 3, wherein a flow of gas passing through the third gas line may be expressed as:

$$F_C = F_{A1} + F_{A2} - TF_{DS}\left(\frac{dP_{DS}}{dt}, V_{DS}\right),$$

wherein $F_C$ is the flow of gas passing through the third gas line $F_{A1}$ is the flow of gas passing through the first gas line, $F_{A2}$ is the flow of gas passing through the second gas line, $P_{DS}$ the pressure measured by the downstream pressure sensor, and $TF_{DS}$ is transitional flow in third gas line, and $V_{DS}$ is volume of the third gas line.

5. The apparatus of claim 1, further comprising a chamber pressure sensor configured to measure a metric indicative of a pressure in a processing chamber, wherein an outlet of the third gas line is configured to be connected to the processing chamber.

6. The apparatus of claim 5, wherein the controller is further configured to control a pressure in the processing chamber, and wherein the controller receives measurement signals from the chamber pressure sensor.

7. An apparatus for gas control, comprising:
a first gas supply line that comprises:
  a first flow sensor;
  a first control valve;
  a first gas line coupled to an inlet of the first flow sensor;
  a second gas line coupled to an outlet of the first flow sensor and an inlet of the first control valve; and
  a first intermediate pressure sensor coupled to the second gas line;
a second gas supply line that comprises:
  a second flow sensor;
  a second control valve
  a third gas line coupled to an inlet of the second flow sensor;
  a fourth gas line coupled to an outlet of the second flow sensor and an inlet of the second control valve; and
  a second intermediate pressure sensor coupled to the fourth gas line; and
an output line coupled to an outlet of the first control valve and an outlet of the second control valve.

8. The apparatus of claim 7, wherein:
the first gas supply line further comprises a first upstream pressure sensor coupled to the first gas line and adapted to sense a metric indicative of pressure within the first gas line, and
the second gas supply line further comprises a second upstream pressure sensor coupled to the third gas line and adapted to sense a metric indicative to pressure within the third gas line.

9. The apparatus of claim 8, wherein a flow of gas passing through the first gas line may be expressed as:

$$F_A = F_S - F_{\Delta P}(dP_U/dt),$$

wherein $F_A$ is the flow of gas passing through the first gas line, $F_S$ is the flow measured by the first flow sensor, $P_U$ is the pressure measured by the first upstream pressure sensor, and $F_{\Delta P}$ is flow compensation due to the pressure changes in the first gas line.

10. The apparatus of claim 8, wherein a flow of gas passing through the first gas line may be expressed as:

$$F_A = F_S + F_{\Delta P_S}\left(\frac{dP_S}{dt}, V_S\right) - F_{\Delta P}(dP_U/dt),$$

wherein $F_A$ is the flow of gas passing through the first gas line, $F_S$ is the flow measured by the first flow sensor, $P_U$ is the pressure measured by the first upstream pressure sensor, $F_{\Delta P}$ is flow compensation due to the pressure changes in the first gas line, $P_S$ is the pressure measured by the first intermediate pressure sensor, and $F_{\Delta P_S}$ is flow compensation due to the pressure changes in the first intermediate gas line.

11. The apparatus of claim 7, further comprising a downstream pressure sensor coupled to the output line and adapted to sense a metric indicative of pressure in the output line.

12. The apparatus of claim 11, wherein a flow of gas passing through the output line may be expressed as:

$$F_C = F_{A1} + F_{A2} - TF_{DS}\left(\frac{dP_{DS}}{dt}, V_{DS}\right),$$

wherein $F_C$ is the flow of gas passing through the outlet line, $F_{A1}$ is the flow of gas passing through the first gas line, $F_{A2}$ is the flow of gas passing through the second gas line, $P_{DS}$ is the pressure measured by the downstream sensor, and $TF_{DS}$ is transitional flow in the outlet line, and $V_{DS}$ is volume of the outlet line.

13. The apparatus of claim 7, further comprising one or more additional gas supply lines, wherein each additional gas supply line comprises:
a flow sensor;
an input gas line coupled to an inlet of the flow sensor;
a control valve coupled to the flow sensor;
an upstream pressure sensor coupled to the input gas line; and
an output gas line having an inlet coupled to the control valve and an outlet coupled to the outlet line.

14. The apparatus of claim 7, further comprising a controller configured to control the ratio of a gas flow from the first gas supply line and a gas flow from the second gas supply line, wherein the controller receives measurement signals from the first and second flow sensors and the first and second intermediate pressure sensors, and sends control signals to the first and second control valves, and wherein measurements of the first and second flow sensors are compensated by measurements of the first and second intermediate pressure sensors, respectively, so that the measurements of the first and second flow sensors are pressure insensitive.

15. A semiconductor substrate processing system, comprising:
a first gas line configured for coupling to a first gas supply;
a first flow sensor having an inlet connected to the first gas line;
a first control valve coupled to the first flow sensor;
a first upstream pressure sensor connected to the first gas line;
a second gas line configured for coupling to a second gas supply;
a second flow sensor having an inlet connected to the second gas line;
a second control valve coupled to the second flow sensor;
a second upstream pressure sensor connected to the second gas line;
a semiconductor substrate processing chamber;
a third gas line having an upstream end connected to outlets of the first and second control valves and a downstream end configured for coupling to the semiconductor substrate processing chamber; and
a controller configured to control a ratio of a gas flow in the first gas line and a gas flow in the second gas line, wherein the controller receives measurements from the first and second flow sensors and first and second upstream pressure sensors, and sends control signals to the first and second control valves, and wherein measurements of the first and second flow sensors are compensated by measurements of the first and second upstream pressure sensors, respectively, so that the measurements of the first and second flow sensors are pressure insensitive.

16. The semiconductor processing system of claim 15, further, wherein measurements of the first upstream pressure sensor are used to calculate an actual gas flow in the first gas line when the pressure of the first gas line changes.

17. The semiconductor processing system of claim 16, further comprising
a first intermediate gas line having an inlet coupled to an outlet of the first flow sensor and an outlet coupled to an inlet of the first control valve; and a first intermediate pressure sensor coupled to the first intermediate gas line, wherein measurements of the first intermediate pressure sensor are used to calculate an actual gas flow in the first intermediate gas line when the pressure of the intermediate gas line changes.

18. The semiconductor processing system of claim 15, further comprising a chamber pressure sensor configured to measure a metric indicative of pressure in the semiconductor substrate processing chamber, wherein the controller is configured to receive a measurement signal from the chamber pressure sensor and control the pressure in the semiconductor substrate processing chamber.

19. The semiconductor processing system of claim 18, wherein the semiconductor substrate processing chamber further comprises a restriction which is configured to open and close, and wherein the controller receives measurements from the first and second flow sensors and the chamber pressure sensor, and sends control signals to the restriction.

20. The semiconductor processing system of claim 15, further comprising a downstream pressure sensor coupled to the third gas line, wherein measurements of the downstream pressure sensor are used to calculate an actual gas flow passing through the third gas line when the pressure in the third gas line changes.

* * * * *

UNITED STATES PATENT AND TRADEMARK OFFICE
CERTIFICATE OF CORRECTION

PATENT NO.         : 7,437,944 B2
APPLICATION NO.    : 11/684888
DATED              : October 21, 2008
INVENTOR(S)        : Melcer et al.

It is certified that error appears in the above-identified patent and that said Letters Patent is hereby corrected as shown below:

In the Detailed Description:

Column 6, Line 23, please delete "$F_A = F_S - F_{66P}\,(dP_U\,/\,dt)$," and insert
--$F_A = F_S - F_{\Delta P}\,(dP_U\,/\,dt)$,-- therefor.

Signed and Sealed this

Second Day of June, 2009

JOHN DOLL
*Acting Director of the United States Patent and Trademark Office*